(12) United States Patent
Jeong et al.

(10) Patent No.: US 11,042,970 B2
(45) Date of Patent: Jun. 22, 2021

(54) IMAGE PROVIDING DEVICE, METHOD, AND COMPUTER PROGRAM

(71) Applicant: Hanwha Techwin Co., Ltd., Seongnam-si (KR)

(72) Inventors: Kyoung Jeon Jeong, Seongnam-si (KR); Dae Hwan Kim, Seongnam-si (KR)

(73) Assignee: HANWHA TECHWIN CO., LTD., Seongnam-si (KR)

( * ) Notice: Subject to any disclaimer, the term of this patent is extended or adjusted under 35 U.S.C. 154(b) by 121 days.

(21) Appl. No.: 16/328,165

(22) PCT Filed: Aug. 31, 2016

(86) PCT No.: PCT/KR2016/009695
§ 371 (c)(1),
(2) Date: Feb. 25, 2019

(87) PCT Pub. No.: WO2018/038300
PCT Pub. Date: Mar. 1, 2018

(65) Prior Publication Data
US 2019/0197671 A1    Jun. 27, 2019

(30) Foreign Application Priority Data

Aug. 24, 2016 (KR) .................. 10-2016-0107781

(51) Int. Cl.
*G06T 5/00* (2006.01)
*G06T 3/00* (2006.01)
(Continued)

(52) U.S. Cl.
CPC ............... *G06T 5/006* (2013.01); *G06T 3/00* (2013.01); *G06T 5/20* (2013.01); *H04N 7/188* (2013.01); *G06T 2207/20104* (2013.01)

(58) Field of Classification Search
CPC .. G06T 5/006; G06T 3/00; G06T 5/20; G06T 2207/20104; G06T 2207/30196; G06T 2207/30232; G06T 3/0062; H04N 7/188
See application file for complete search history.

(56) References Cited

U.S. PATENT DOCUMENTS 5,990,941 A * 11/1999 Jackson ................ G06T 3/0062
348/207.99
2002/0063802 A1* 5/2002 Gullichsen ........... H04N 5/2628
348/607
(Continued)

FOREIGN PATENT DOCUMENTS

JP    2008-301034 A    12/2008
JP    2014-42160 A    3/2014
(Continued)

OTHER PUBLICATIONS

International Search Report (PCT/ISA/210) dated May 18, 2017 issued by the International Searching Authority in International Application No. PCT/KR2016/009695.
(Continued)

*Primary Examiner* — Nizar N Sivji
(74) *Attorney, Agent, or Firm* — Sughrue Mion, PLLC

(57) ABSTRACT

An embodiment of the present invention provides an image providing method including: obtaining a user input that sets an area of interest on a fisheye image; setting a transformation area corresponding to at least a part of the fisheye image based on the user input; and generating a transformed image by dewarping a fisheye image corresponding to the transformation area.

20 Claims, 9 Drawing Sheets

(51) Int. Cl.
*H04N 7/18* (2006.01)
*G06T 5/20* (2006.01)

(56) References Cited

U.S. PATENT DOCUMENTS

| | | | | |
|---|---|---|---|---|
| 2005/0265619 | A1* | 12/2005 | Ozaki | G06T 5/006 382/254 |
| 2006/0029255 | A1* | 2/2006 | Ozaki | B60R 1/00 382/104 |
| 2010/0303383 | A1* | 12/2010 | Huggett | H04N 5/23229 382/282 |
| 2011/0141321 | A1* | 6/2011 | Tang | G06T 3/0062 348/240.99 |
| 2014/0347470 | A1* | 11/2014 | Zhang | B60R 1/00 348/118 |
| 2015/0358539 | A1* | 12/2015 | Catt | G06T 5/006 348/38 |
| 2016/0119551 | A1* | 4/2016 | Brown | G06T 3/0062 345/646 |

FOREIGN PATENT DOCUMENTS

| | | |
|---|---|---|
| JP | 2015-46949 A | 3/2015 |
| KR | 10-2012-0008827 A | 2/2012 |
| KR | 10-2014-0077619 A | 6/2014 |
| KR | 10-2014-0137485 A | 12/2014 |
| KR | 10-1619953 B1 | 5/2016 |

OTHER PUBLICATIONS

Written Opinion (PCT/ISA/237) dated May 18, 2017 issued by the International Searching Authority in International Application No. PCT/KR2016/009695.

* cited by examiner

IMAGE PROVIDING DEVICE, METHOD, AND COMPUTER PROGRAM

TECHNICAL FIELD

Embodiments of the present invention relate to an image providing device and method and a computer product.

BACKGROUND ART

Numerous surveillance cameras have been installed in many places, and technologies for recording, storing, and transmitting images obtained by surveillance cameras have been developed.

In particular, as more surveillance cameras are installed, more systems for providing a plurality of views by using one fisheye camera, instead of systems including a plurality of surveillance cameras, are being installed.

However, there is a problem in that it is difficult for users to clearly designate and observe areas of interest in fisheye images obtained by fisheye cameras.

DESCRIPTION OF EMBODIMENTS

Technical Problem

Provided are an image providing device and method and a computer program which may more easily and conveniently designate an area of interest in a fisheye image.

Provided are an image providing device and method and a computer program which may set a best transformation area for an area of interest designated by a user.

Provided are an image providing device and method and a computer program which may provide a more detailed transformed image of an area of interest designated by a user.

Solution to Problem

An image providing method according to an embodiment of the present invention may include: obtaining a user input that sets an area of interest on a fisheye image; setting a transformation area corresponding to at least a part of the fisheye image based on the user input; and generating a transformed image by dewarping a fisheye image corresponding to the transformation area.

The obtaining of the user input may include obtaining an input of a figure for setting the area of interest on the fisheye image, and the setting of the transformation area may include setting the transformation area such that an area generated by the figure is included in the transformation area.

The setting of the transformation area may include: setting one point in the area generated by the figure as a reference point; and determining the transformation area by reducing the transformation area about the reference point until at least one outer line of the transformation area contacts at least one point on an outer line of the figure.

The determining of the transformation area may include determining the transformation area by equally reducing the at least one outer line of the transformation area around the reference point until one outer line from among the at least one outer line of the transformation area contacts one point on the outer line of the figure.

The determining of the transformation area may include, when one outer line from among the at least one outer line of the transformation area contacts one point on the outer line of the figure, determining the transformation area by reducing the transformation area by reducing remaining outer lines other than the outer line contacting the one point on the outer line of the figure until the remaining outer lines contact any one point on the outer line of the figure.

The determining of the transformation area may include determining, as the transformation area, an enlarged transformation area obtained by enlarging the transformation area, which is reduced around the reference point, at a predetermined ratio around the reference point.

The figure may be any one of a polygon and a circle, and the polygon may be a quadrangle.

The setting of the transformation area may include displaying at least one outer line of the transformation area on the fisheye image.

The obtaining of the user input may include obtaining a user input that sets the area of interest in a shape of a transformation-suitable figure, and the setting of the transformation area may include setting the entire area of interest set in the shape of the transformation-suitable figure as a transformation area, wherein the shape of the transformation-suitable figure is a shape that allows a rectangular transformed image to be generated when a fisheye image corresponding to the transformation-suitable figure is dewarped.

The obtaining of the user input may include displaying an input guide line that enlarges or reduces one outer line from among at least one outer line of the transformation-suitable figure on the fisheye image.

The obtaining of the user input may include obtaining a user input for a plurality of areas of interest, the setting of the transformation area may include setting a transformation area corresponding to each of the plurality of areas of interest, and the generating of the transformed image may include generating a transformed image of each of the plurality of areas of interest.

The image providing method according to an embodiment of the present invention may further include, after the generating of the transformed image, displaying the transformed image.

An image providing device according to an embodiment of the present invention may include a controller configured to: obtain a user input that sets an area of interest on a fisheye image; set a transformation area corresponding to at least a part of the fisheye image based on the user input; and generate a transformed image by dewarping a fisheye image corresponding to the transformation area.

The user input may include an input of a figure for setting the area of interest on the fisheye image, and the transformation area may include an area generated by the figure.

The user input may include a user input that sets the area of interest in a shape of a transformation-suitable figure, and the transformation area may include the entire area of interest set in the shape of the transformation-suitable figure, wherein the shape of the transformation-suitable figure is a shape that allows a rectangular transformed image to be generated when a fisheye image corresponding to the transformation-suitable figure is dewarped.

The controller may be further configured to: obtain a user input for a plurality of areas of interest; set a transformation area corresponding to each of the plurality of areas of interest; and generate a transformed image of each of the plurality of areas of interest.

The controller may be further configured to display the transformed image on a display.

Other aspects, features, and advantages will become apparent from the following drawings, claims, and the detailed description of the invention.

Advantageous Effects of Disclosure

According to an embodiment of the present invention, there may be provided an image providing device and method and a computer program which may more easily and conveniently designate an area of interest in a fisheye image.

Also, according to an embodiment of the present invention, there may be provided an image providing device and method and a computer program which may set a best transformation area for an area of interest designated by a user.

Furthermore, according to an embodiment of the present invention, there may be provided an image providing device and method and a computer program which may provide a more detailed transformed image of an area of interest designated by a user.

BEST MODE

Figure 1:
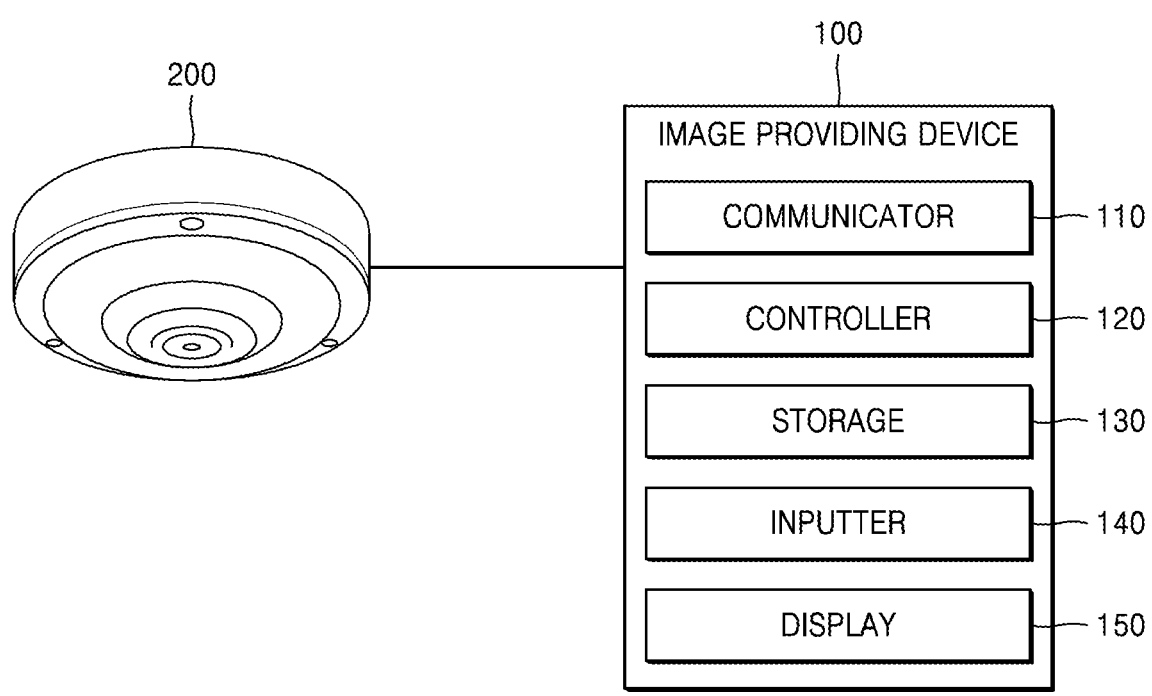
FIG. 1 is a view of an image providing system according to an embodiment of the present invention.

The present invention may include various embodiments and modifications, and exemplary embodiments thereof will be illustrated in the drawings and will be described herein in detail. The effects and features of the present invention and the accompanying methods thereof will become apparent from the following description of the embodiments, taken in conjunction with the accompanying drawings. However, the present invention is not limited to the embodiments described below, and may be embodied in various modes.

Reference will now be made in detail to embodiments, examples of which are illustrated in the accompanying drawings. In the drawings, the same elements are denoted by the same reference numerals, and a repeated explanation thereof will not be given.

It will be understood that although the terms "first", "second", etc. may be used herein to describe various components, these components should not be limited by these terms. These components are only used to distinguish one component from another. As used herein, the singular forms "a", "an", and "the" are intended to include the plural forms as well, unless the context clearly indicates otherwise. It will be further understood that the terms "comprises" and/or "comprising" used herein specify the presence of stated features or components, but do not preclude the presence or addition of one or more other features or components. Sizes of components in the drawings may be exaggerated for convenience of explanation. In other words, since sizes and shapes of components in the drawings are arbitrarily illustrated for convenience of explanation, the present invention is not limited thereto.

FIG. 1 is a view of an image providing system according to an embodiment of the present invention.

Referring to FIG. 1, the image providing system according to an embodiment of the present invention may include an image providing device 100 and an image obtaining device 200.

The imaging obtaining device 200 according to an embodiment of the present invention may be a camera including a lens and an image sensor.

The lens may be a lens group including one or more lenses. Also, the lens may be an ultra-wide angle lens having a viewing angle of 180° or more.

The image sensor may convert an image input by the lens into an electrical signal. For example, the image sensor may be a semiconductor device that may convert an optical signal into an electrical signal (hereinafter, referred to as an image) such as a charge-coupled device (CCD) or a complementary metal-oxide semiconductor (CMOS). The image obtaining device 200 may be a camera that provides an RGB image of a space to be photographed, in particular, a fisheye image of the space to be photographed.

Although the following is described on the assumption that the image obtaining device 200 is a fisheye camera that provides a fisheye image of a space to be photographed, the spirit and scope of the present invention are not limited thereto.

The term 'fisheye image' used herein may refer to an image obtained by a fisheye camera, or a wide angle image or a distorted image.

The image providing device 100 according to an embodiment of the present invention may receive a fisheye image from the image obtaining device 200, may obtain a user input for an area of interest, and may provide a dewarping image of the area of interest. To this end, the image providing device 100 according to an embodiment may include a communicator 110, a controller 120, a storage 130, an inputter 140, and a display 150.

The communicator 110 may be a device including hardware or software needed to transmit/receive a signal such as a control signal or a data signal through wired/wireless connection between the image providing device 100 and another network device such as the image obtaining device 200 and/or a server (not shown)

The controller 120 may include any type of device capable of processing data such as a processor. The term 'processor' used herein may refer to, for example, a hardware-implemented data processing device having circuitry that is physically structured to execute desired operations including, for example, operations represented as code and/or instructions included in a program. Examples of the hardware-implemented data processing device include, but are not limited to, a microprocessor, a central processing unit (CPU), a processor core, a multiprocessor, an application-specific integrated circuit (ASIC), and a field programmable gate array (FPGA).

The storage 130 temporarily or permanently stores data processed by the image providing device 100. The storage 130 may include, but are not limited to, a magnetic storage medium or a flash storage medium.

The inputter 140 may be any of various input units for obtaining a user input that sets an area of interest. The inputter 140 may include, but are not limited to, a keyboard, a mouse, a trackball, a microphone, a button, and/or a touch panel.

The display 150 may be a display device that displays a figure, letters, or a combination thereof according to an electrical signal generated by the controller 120. For example, the display 150 may include any one of, but not limited to, a cathode ray tube (CRT), a liquid crystal display (LCD), a plasma display panel (PDP), and an organic light-emitting diode (OLED).

Although the following is described on the assumption that the image providing device 100 includes all of the communicator 110, the controller 120, the storage 130, the inputter 140, and the display 150, the spirit and scope of the present invention are not limited thereto. Accordingly, according to an alternative embodiment, the image providing device 100 may include only the communicator 110, the controller 120, and the storage 130, and may not include the inputter 140 and the display 150. In this case, the inputter 140 and the display 150 may be electrically connected as separate devices to the image providing device 100.

The controller 120 according to an embodiment may obtain a user input that sets an area of interest in a fisheye image. In this case, the user input may be performed by the inputter 140.

The term 'area of interest' used herein may refer to an area to be observed by a user in more detail in the fisheye image. For example, when an event occurs in a portion of the fisheye image, the user may set the portion as the area of interest and may observe the portion in more detail by observing a transformed image of the portion set as the area of interest.

The area of interest may be set by using various methods. For example, the user may set the area of interest by 'inputting a figure' for setting the area of interest on the fisheye image. Also, the user may set the area of interest by 'inputting a transformation-suitable figure' on the fisheye image.

Two methods of setting the area of interest will now be described in more detail.

FIGS. 2A through 4 are views for describing a method of setting an area of interest by inputting a figure on a fisheye image and setting a transformation area based on the area of interest.

Figure 2A:
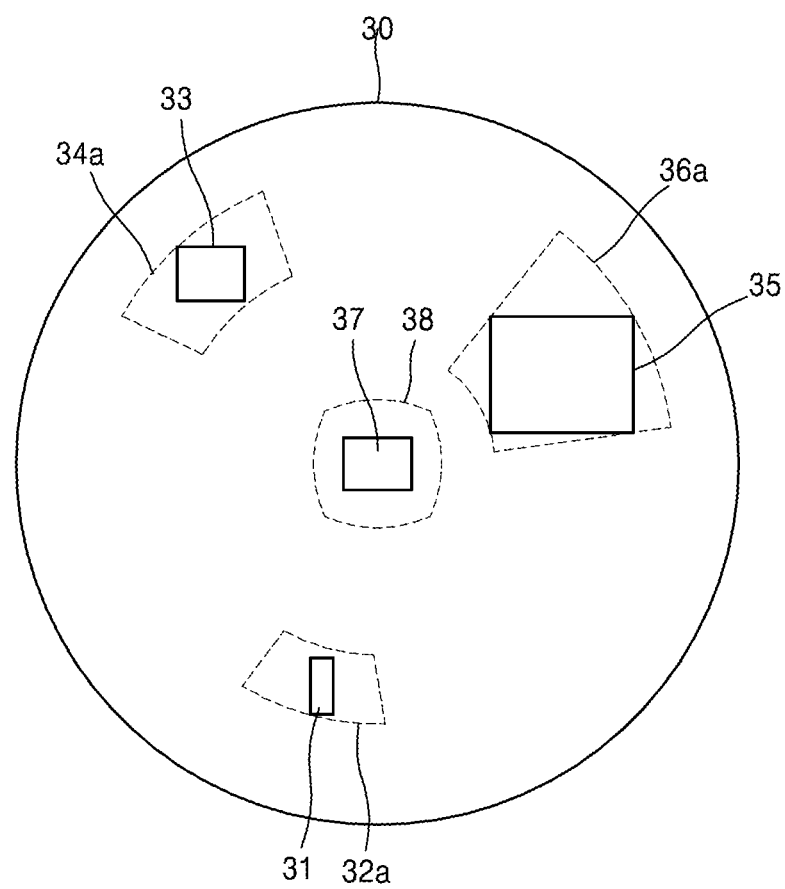
FIGS. 2A through 4 are views for describing a method of setting an area of interest by inputting a figure on a fisheye image and setting a transformation area based on the area of interest.

Referring to FIG. 2A, the controller 120 according to an embodiment may obtain a user input that sets an area of interest on a fisheye image 30. For example, the controller 120 may obtain an input of FIGS. 31, 33, 35, and 37 for setting the area of interest on the fisheye image 30.

The term 'figure' used herein may refer to a polygon including one or more points and a line connecting the one or more points. Examples of the polygon of the present invention may include a quadrangle, a triangle, and a pentagon. The 'figure' may be a circle. Although the following is described on the assumption that the 'figure' is a quadrangle for convenience of explanation, the spirit and scope of the present invention are not limited thereto.

A user may input the FIGS. 31, 33, 35, and 37 by using various methods. For example, when the figure is a quadrangle, the user may input the quadrangle by using a method of inputting one vertex of the quadrangle and another vertex diagonal to the vertex. Also, when the figure is a circle, the user may input the circle by using a method of inputting one point that is a center point and another point that determines a radius. The user input may be performed by the inputter 140, and the controller 120 may obtain the user input that is converted into an electrical signal through the inputter 140.

The controller 120 may set transformation areas 32*a*, 34*a*, 36*a*, and 38 corresponding to at least parts of the fisheye image 30 based on the input of the FIGS. 31, 33, 35, and 37.

In more detail, the controller 120 may set one point in an area generated by each of the FIGS. 31, 33, 35, and 37 as a reference point, and may determine a transformation area by reducing the transformation area around the reference point until at least one outer line of each of the transformation areas 32*a*, 34*a*, 36*a*, and 38 contacts at least one point on an outer line of each of the FIGS. 31, 33, 35, and 37. In this case, the reference point may be any one of a center point and a center of gravity of the figure.

A basic shape of each of the transformation areas 32*a*, 34*a*, 36*a*, and 38 may be the same as a shape of a transformation-suitable figure. In this case, the shape of the transformation-suitable figure may be a shape that allows a rectangular transformed image to be generated when a fisheye image corresponding to the transformation-suitable figure is dewarped. In general, since a rectangular transformed image is generated when a fisheye image corresponding to a fan-shaped area is dewarped, the transformation-suitable figure may be a fan-shaped figure.

When a center point of the fisheye image 30 is included in the FIG. 37 input by the user, a shape of a transformation area may be different from the shape of the transformation-suitable figure. In this case, a shape of the transformation area 38 may be a distorted quadrangular or circular shape as shown in FIG. 2A.

Various methods by which the controller 120 sets a transformation area will now be described with reference to FIGS. 2B through 2D.

Figure 2B:
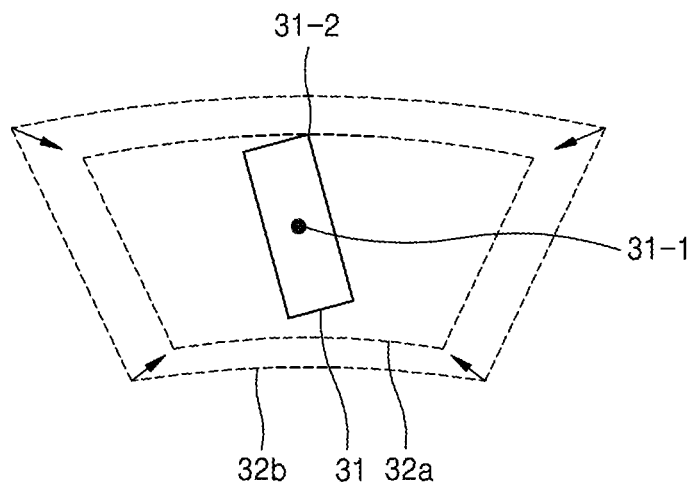

FIG. 2B is a view for describing a process by which the controller 120 sets the transformation area 32*a* corresponding to the FIG. 31 according to an embodiment of the present invention.

Referring to FIG. 2B, the controller 120 may set one point in an area generated by the FIG. 31 as a reference point 31-1. In this case, the reference point 31-1 may be any one of a center point and a center of gravity as described above.

Next, the controller 120 may equally reduce a transformation area 32*b* about the reference point 31-1 until one outer line from among at least one outer line of the transformation area 32*b* contacts one point 31-2 on an outer line of the FIG. 31.

The controller 120 may determine the transformation area 32*a* when the one outer line contacts the one point 31-2 on the outer line of the FIG. 31, as a transformation area of the FIG. 31. In this case, an aspect ratio of the transformation area 32*a* may always be constant irrespective of a size and/or a shape of the FIG. 31, which may mean that an aspect ratio of a transformed image is always constant.

Figure 2C:
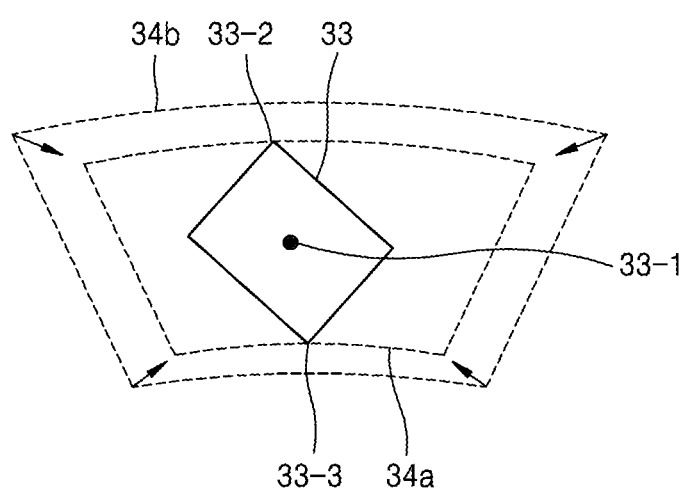

FIG. 2C is a view for describing a process by which the controller 120 sets the transformation area 34*a* corresponding to the FIG. 33 according to an embodiment of the present invention.

Although the controller 120 sets a transformation area when one outer line from among at least one outer line of a transformation area contacts one point on an outer line of a figure as a transformation area of the figure in FIG. 2B, the controller 120 sets the transformation area 34*a* when one outer line from among at least one outer line of a transformation area contacts one or more points 33-2 and 33-3 on an outer line of the FIG. 33 as a transformation area of the FIG. 33 in FIG. 2C.

First, the controller 120 may set any one point in an area generated by the FIG. 33 as a reference point 33-1. In this case, the reference point 33-1 may be any one of a center point and a center of gravity as described above.

Next, the controller 120 may equally reduce a transformation area 34b about the reference point 33-1 until one outer line from among at least one outer line of the transformation area 34b contacts one or more points 33-2 and 33-3 on an outer line of the FIG. 33. The controller 120 may determine the transformation area 34a when the one outer line from among the at least one outer line of the transformation area 34b contacts the one or more points 33-2 and 33-3 on the outer line of the FIG. 33 as a transformation area of the FIG. 33. An aspect ratio of the transformation area 34a may always be constant irrespective of a size and/or a shape of the FIG. 33.

Although a case where a vertex of a figure and an outer line of a transformation area contact each other has been described with reference to FIGS. 2B and 2C, the spirit and scope of the present invention are not limited thereto. Accordingly, it is obvious that a case where an outer line of a figure and an outer line of a transformation area intersect each other may also be included in the present invention.

Figure 2D:
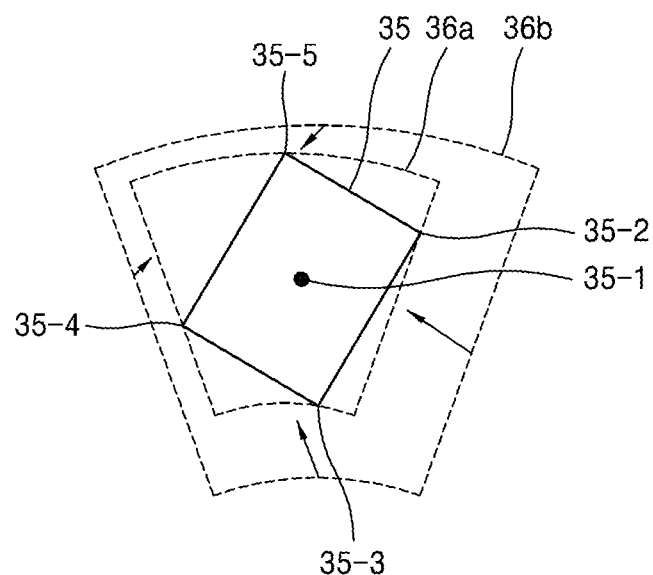

FIG. 2D is a view for describing a process by which the controller 120 sets the transformation area 36a corresponding to the FIG. 35 according to an embodiment of the present invention.

Although an aspect ratio of a transformation area is always constant irrespective of a size and/or a shape of a figure in FIGS. 2B and 2C, an aspect ratio of a transformation area may vary according to a size and/or a shape of a figure in FIG. 2D.

First, the controller 120 may set one point in an area generated by the FIG. 35 as a reference point 35-1.

The controller 120 may equally reduce a transformation area 36b about the reference point 35-1 until one outer line from among at least one outer line of the transformation area 36b contacts one point 35-5 on an outer line of the FIG. 35.

When the one outer line from among the at least one outer line of the transformation area 36b contacts the one point 35-5 on the outer line of the FIG. 35, the controller 120 may reduce the transformation area 36b by reducing remaining outer lines other than the outer line contacting the one point 35-5 on the outer line of the FIG. 35 until the remaining outer lines contact any one of points 35-2, 35-3, and 35-4 on the outer line of the FIG. 35. In this case, the controller 120 may reduce the remaining outer lines about the reference point 35-1, or may reduce the remaining outer lines about a variable reference point (not shown). The variable reference point may refer to a reference point that is changed as each outer line is reduced.

Next, the controller 120 may determine the reduced transformation area as the transformation area 36a of the FIG. 35. In this case, an aspect ratio of the transformation area 36a may vary according to a size and/or a shape of the FIG. 35, and thus an aspect ratio of a transformed image may be changed.

Figure 3:
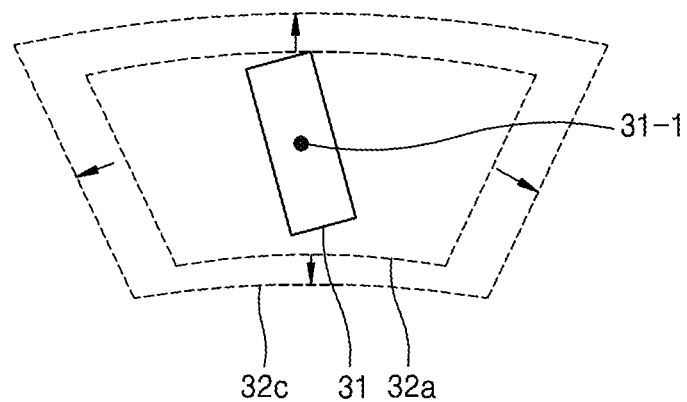

FIG. 3 is a view for describing a method by which the controller 120 enlarges a determined transformation area and determines a new transformation area according to an embodiment of the present invention.

Various methods by which the controller 120 determines a transformation area in various ways have been described with reference to FIGS. 2A through 2D. However, even when the methods are used, since a user inputs an area of interest in a polygonal or circular shape, an area to be observed by the user may not be fully included in a transformation area in certain circumstances.

Accordingly, the controller 120 may enlarge the transformation area 32a, which is reduced about the reference point 31-1 by using the above methods, at a predetermined ratio about the reference point 31-1 again and may determine an enlarged transformation area 32c as a transformation area.

Accordingly, the controller 20 may prevent the above-described problem by enlarging a transformation area set based on a user input at a predetermined ratio.

The controller 120 according to an embodiment may generate a transformed image by dewarping a fisheye image corresponding to a transformation area.

The term 'dewarping' used herein may refer to a process of converting a fisheye image into a general image. In this case, the controller 120 may dewarp a fisheye image into a general image according to various dewarping algorithms.

Next, the controller 120 may provide a transformed image to a user. In other words, the controller 120 may display the transformed image on the display 150.

Figure 4:
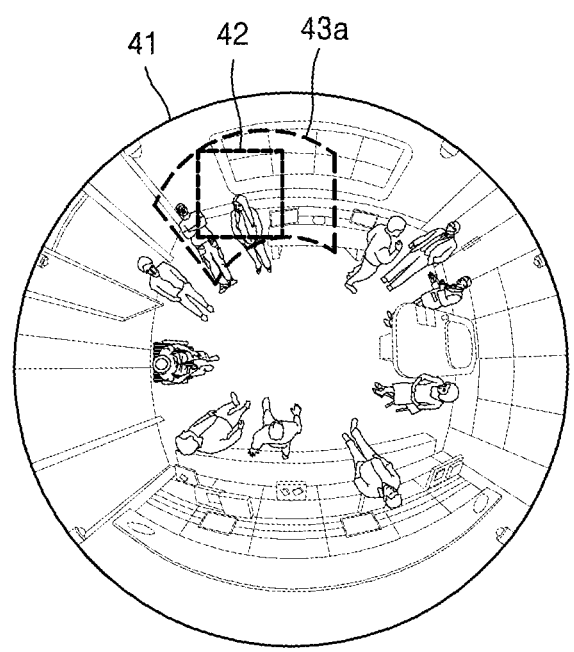
Figure 4:
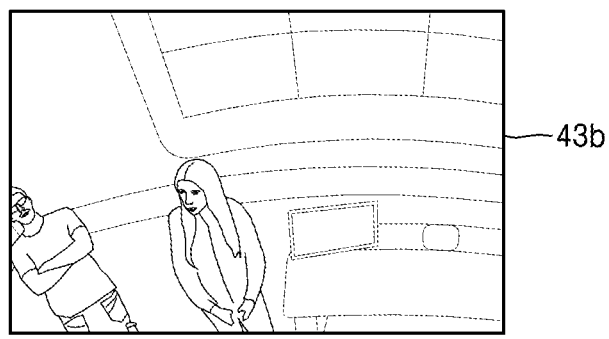

FIG. 4 is a view of a transformed image generated when a user sets an area of interest by using a figure according to an embodiment of the present invention.

As described above, a user may set an area of interest by using a FIG. 42 in a fisheye image 41. The controller 120 may set a transformation area 43a according to the FIG. 42 input by the user. In this case, the controller 120 may display at least one outer line of the transformation area 43a on the fisheye image 41. The user may more easily and conveniently grasp which portion of the fisheye image 41 is converted by observing the at least one outer line of the transformation area 43a displayed on the fisheye image 41.

The controller 120 may generate a transformed image 43b by dewarping a fisheye image corresponding to the transformation area 43a and may provide the transformed image 43b to the user through the display 150.

Accordingly, the user may set the area of interest on the fisheye image 41 and may receive the transformed image 43b according to the set area of interest.

The above embodiment may have a problem that since a shape of a transformation area and a shape of a figure input by the user are different from each other, a transformed image may not sufficiently reflect an area of interest of the user or the transformed image may excessively include an image of an area in addition to the area of interest.

Accordingly, the user may solve the problem by setting the area of interest in a shape of a transformation-suitable figure that is the shape of the transformation area. In this case, the shape of the transformation-suitable figure may be a shape that allows a rectangular transformed image to be generated when a fisheye image corresponding to the transformation-suitable figure is dewarped. In general, since a rectangular transformed image is generated when a fan-shaped area in a fisheye image is dewarped, the transformation-suitable figure may be a fan-shaped figure.

Figure 5A:
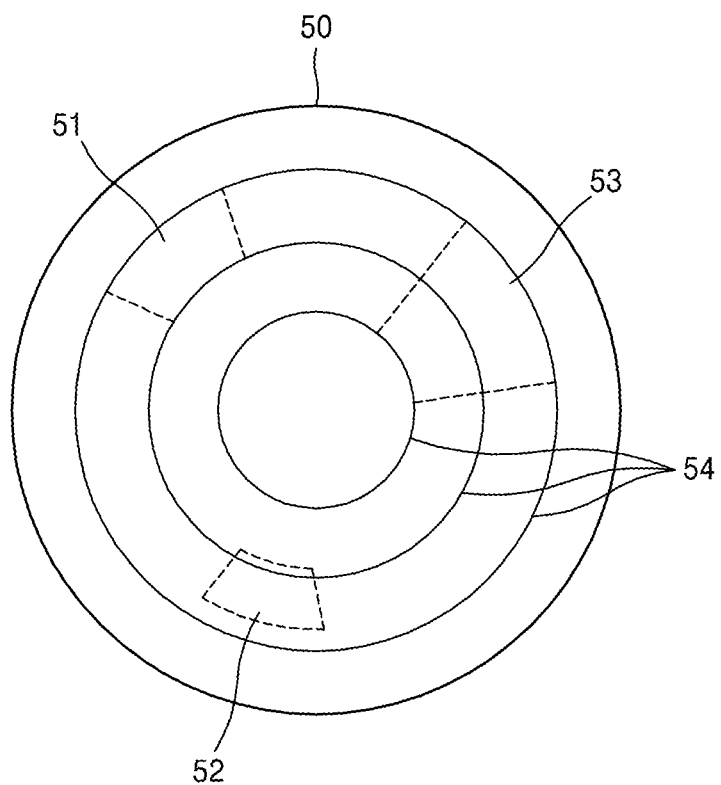
FIGS. 5A through 6 are views for describing a method by which a user sets an area of interest in a shape of a transformation-suitable figure.
Figure 5B:
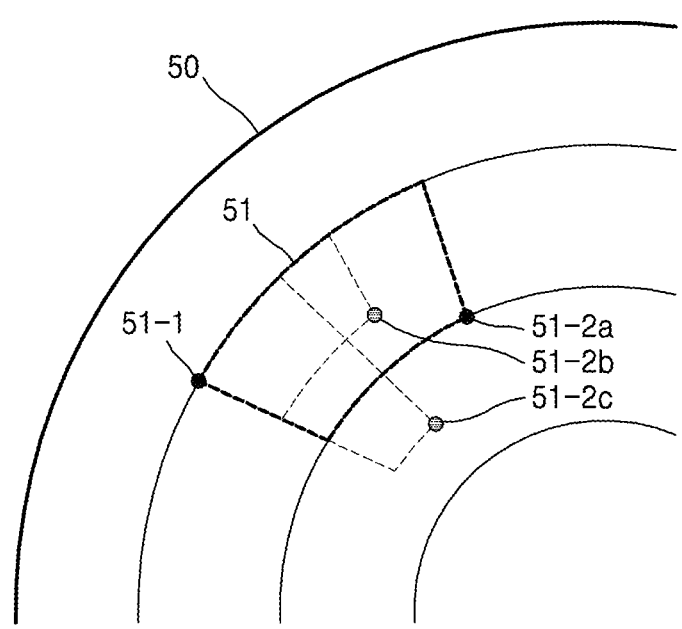
Figure 6:
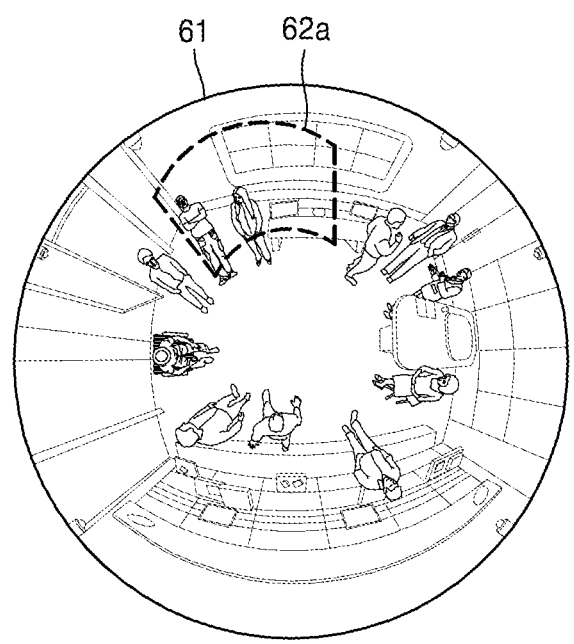
Figure 6:
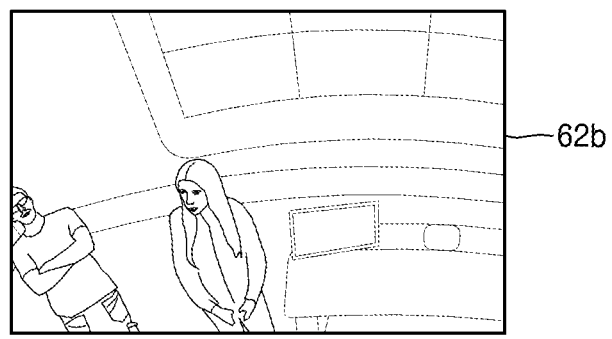

FIGS. 5A through 6 are views for describing a method by which a user sets an area of interest in a shape of a transformation-suitable figure.

First, referring to FIG. 5A, the controller 120 may obtain a user input that sets an area of interest in any of shapes of transformation-suitable FIGS. 51 through 53. In this case, an input guide line 54 that enlarges or reduces one outer line from among at least one outer line of a transformation-suitable figure may be displayed for convenience of a user input.

In FIGS. 2A through 4, the controller 120 obtains an input of a figure for setting an area of interest and generates a transformation area based on the input of the figure. In FIGS. 5A through 6, since an area of interest is set in any of shapes of the transformation-suitable FIGS. 51 through 53, a process of generating a transformation area based on an input of a figure may be omitted.

FIG. 5B is a view for describing a process of obtaining a user input that sets an area of interest in a shape of the transformation-suitable FIG. 51 in more detail.

Referring to FIG. 5B, the controller 120 may receive an area of interest in a shape of the transformation-suitable FIG. 51 by obtaining an input of two points for a fisheye image 50.

First, the controller 120 may receive a first point 51-1, and then may receive any of second points 51-2a, 51-2b, and 51-2c. When a user inputs one second point 51-2 from among the three second points 51-2a, 51-2b, and 51-2c, the controller 120 may set a transformation area so that a top-left vertex of the transformation-suitable FIG. 51 is located at the first point 51-1 and a bottom-right vertex of the transformation-suitable FIG. 51 is located at the second point 51-2a. In this case, the transformation-suitable FIG. 51 may correspond to an area of interest of the user.

Accordingly, according to the present embodiment, the user may accurately select a desired area and may observe a transformed image of the selected area.

FIG. 6 is a view of a transformed image generated when a user sets an area of interest as a transformation-suitable figure according to an embodiment of the present invention.

As described above, a user may set an area of interest as a transformation-suitable FIG. 62a in a fisheye image 61. The controller 120 may set the entire area of interest set in a shape of the transformation-suitable FIG. 62a as a transformation area. In this case, since an area of the transformation-suitable FIG. 62a and the transformation area match each other, the user may more intuitively grasp which portion of the fisheye image 61 is changed.

Next, the controller 120 may generate a transformed image 62b by dewarping a fisheye image corresponding to the transformation area and may provide the transformed image 62b to the user through the display 150.

Accordingly, the user may set an area of interest on the fisheye image 61 and may receive the transformed image 62b according to the set area of interest. Also, the problem that since a shape of a transformation area and a shape of a figure input by the user are different from each other, a transformed image may not sufficiently reflect an area of interest of the user or the transformed image may excessively include an image of an area in addition to the area of interest may be solved.

Figure 7:
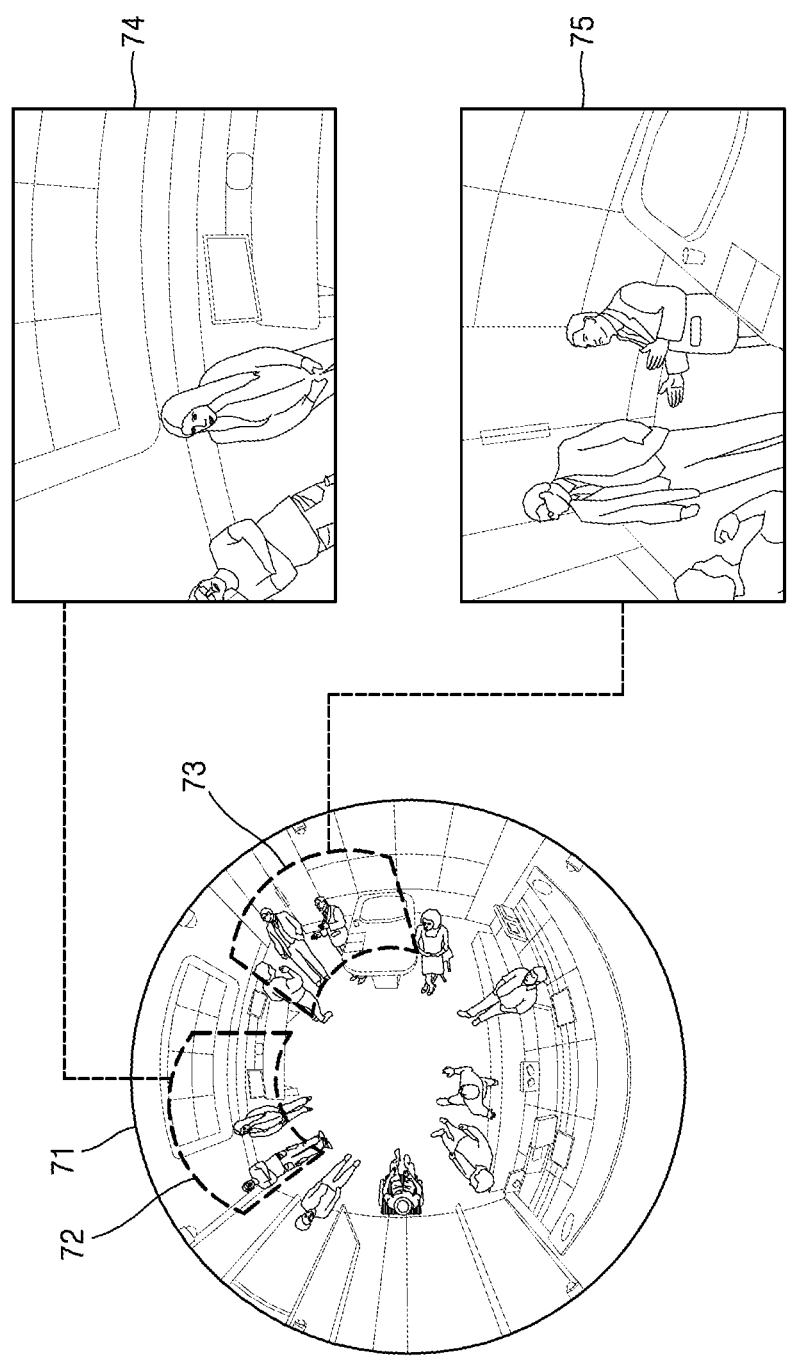
FIG. 7 is a view of a screen displayed on a display according to an embodiment of the present invention.

FIG. 7 is a view of a screen displayed on the display 150 according to an embodiment of the present invention.

Referring to FIG. 7, a screen may include a fisheye image 71 and transformed images 74 and 75 of an area of interest set by a user.

When the user inputs two areas of interest to the fisheye image 71, the controller 120 may set transformation areas 72 and 73 for the areas of interest and may generate the transformed images 74 and 75 by dewarping fisheye images corresponding to the transformation areas 72 and 73.

Figure 8:
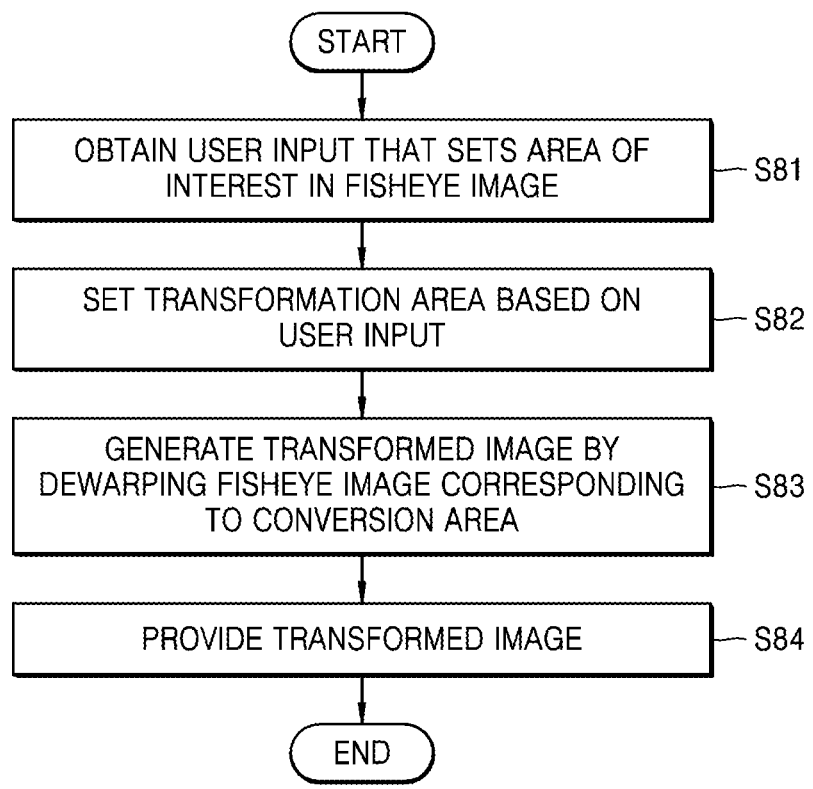
FIG. 8 is a flowchart for describing a method by which a controller provides a transformed image by obtaining a user input that sets an area of interest, according to an embodiment of the present invention.

FIG. 8 is a flowchart for describing a method by which the controller 120 provides a transformed image by obtaining a user input that sets an area of interest according to an embodiment of the present invention. The same description as that made with reference to FIGS. 1 through 7 will not be repeatedly given in detail.

In operation S81, the controller 120 according to an embodiment may obtain a user input that sets an area of interest in a fisheye image. In this case, the user input may be performed by the inputter 140.

The setting of the area of interest may be performed by using various methods. For example, a user may set the area of interest by 'inputting a figure' for setting the area of interest on the fisheye image.

In this case, the term 'figure' used herein may refer to a polygon including one or more points and a line connecting the one or more points. Examples of the polygon of the present invention may include a quadrangle, a triangle, and a pentagon. The 'figure' may be a circle.

The user may input the figure by using various methods. For example, when the figure is a quadrangle, the user may input the quadrangle by using a method of inputting one vertex of the quadrangle and another vertex diagonal to the vertex. Also, when the figure is a circle, the user may input the circle by using a method of inputting one point that is a center point and another point that determines a radius. The user input may be performed through the inputter 1470, and the controller 120 may obtain the user input that is converted into an electrical signal through the inputter 140.

Also, the user may set the area of interest by 'inputting a transformation-suitable figure' on the fisheye image.

In this case, a shape of the transformation-suitable figure may be a shape that allows a rectangular transformed image to be generated when a fisheye image corresponding to the transformation-suitable figure is dewarped. In general, since a rectangular transformed image is generated when a fan-shaped area in a fisheye image is dewarped, the transformation-suitable figure may be a fan-shaped figure.

The controller 120 may receive the area of interest in the shape of the transformation-suitable figure by obtaining an input of two points for the fisheye image 50.

In operation S82, the controller 120 according to an embodiment may set a transformation area corresponding to at least a part of the fisheye image based on the user input. In more detail, the controller 120 may set one point in an area generated by a figure as a reference point, and may determine a transformation area by reducing the transformation area about the reference point until at least one outer line of the transformation area contacts at least one point on an outer line of the figure. In this case, the reference point may be any one of a center point and a center of gravity of the figure. In this case, a basic shape of the transformation area may be the same as the shape of the transformation-suitable figure.

For example, the controller 120 may set one point in an area generated by a figure as a reference point. The controller 120 may equally reduce a transformation area about the reference point until one outer line of at least one outer line of the transformation area contacts one point on an outer line of the figure. The controller 120 may determine the transformation area when the one outer line contacts the one point on the outer line of the figure as a transformation area of the figure. In this case, an aspect ratio of the transformation area may always be constant irrespective of a size and/or a shape of the figure, which may mean that an aspect ratio of a transformed image is always constant.

As another example, the controller 120 may set one point in an area generated by a figure as a reference point. The controller 120 may equally reduce a transformation area about the reference point until one outer line from among at least one outer line of the transformation area contacts one or more points on an outer line of the figure. The controller 120 may determine the transformation area when the one outer line from among the at least one outer line of the transformation area contacts the one or more points on the outer line of the figure as a transformation area of the figure.

An aspect ratio of the transformation area may always be constant irrespective of a size and/or a shape of the figure.

As another example, the controller 120 may set one point in an area generated by a figure as a reference point. The controller 120 may equally reduce a transformation area about the reference point until one outer line from among at least one outer line of the transformation area contacts one point on an outer line of the figure. When the one outer line from among the at least one outer line of the transformation area contacts the one point on the outer line of the figure, the controller 120 may reduce the transformation area by reducing remaining outer lines other than the outer line contacting the one point on the outer line of the figure until the remaining outer lines contact points on the outer line of the figure. In this case, the controller 120 may reduce the remaining outer lines about the reference point, or may reduce the remaining outer lines about a variable reference point. The variable reference point may refer to a reference point that is changed as each outer line is reduced. The controller 120 may determine the reduced transformation area as a transformation area of the figure. In this case, an aspect ratio of the transformation area may vary according to a size and/or a shape of the figure, and thus an aspect ratio of a transformed image may be changed.

When the controller 120 receives the area of interest in the shape of the transformation-suitable figure, the controller 120 may set the area of interest itself in the shape of the transformation-suitable figure as the transformation area. In this case, the controller 120 may omit a process of generating the transformation area based on an input of the figure.

In operation S83, the controller 120 according to an embodiment may generate a transformed image by dewarping a fisheye image corresponding to the transformation area. The 'dewarping' used herein may refer to a process of converting a fisheye image into a general image. In this case, the controller 120 may dewarp the fisheye image into a general image according to various dewarping algorithms.

Next, in operation S84, the controller 120 may provide the transformed image to the user. In other words, the controller 120 may display the transformed image on the display 150.

The one or more embodiments of the present invention may be implemented as a computer program which may be executed by various computer means, and the computer program may be recorded on a computer-readable recording medium. Examples of the computer-readable recording medium include storage media such as magnetic media (e.g., hard discs, floppy discs, or magnetic tapes), optical media (e.g., compact disc-read only memories (CD-ROMs), or digital versatile discs (DVDs)), magneto-optical media (e.g., floptical discs), and hardware devices that are specially configured to store and carry out program instructions (e.g., read-only memories (ROMs), random-access memories (RAMs), or flash memories). Furthermore, examples of the computer-readable recording medium include intangible media that may be transmitted through a network. For example, the computer-readable recording medium may be implemented as software or an application and may be transmitted and distributed through a network.

The computer program may be specially designed and constructed for the present invention or may be known to and usable by one of ordinary skill in the field of computer software. Examples of the computer program may include not only machine language code that is made by a compiler but also high-level language code that may be executed by a computer by using an interpreter or the like.

The particular implementations shown and described herein are illustrative examples of the present invention and are not intended to otherwise limit the scope of the present invention in any way. For the sake of brevity, conventional electronics, control systems, software development and other functional aspects of the systems may not be described. Furthermore, the connecting lines or connectors shown in the various figures presented are intended to represent exemplary functional relationships and/or physical or logical couplings between the various elements. It should be noted that many alternative or additional functional relationships, physical connections, or logical connections may be present in a practical device. Moreover, no item or component is essential to the practice of the present invention unless the element is specifically described as "essential" or "critical".

Accordingly, it is not intended to limit the present invention to particular embodiments, and it is to be appreciated that all changes, equivalents, and substitutes that do not depart from the spirit and technical scope of the present invention are encompassed in the present invention.

The invention claimed is:

1. An image providing method comprising:
obtaining a user input that sets an area of interest on a fisheye image;
setting a transformation area corresponding to at least a part of the fisheye image based on the user input; and
generating a transformed image by dewarping the fisheye image corresponding to the transformation area,
wherein the obtaining of the user input comprises obtaining at least two inputs for points defining a figure for setting the area of interest on the fisheye image.

2. The image providing method of claim 1, wherein the setting of the transformation area comprises setting the transformation area such that an area generated by the figure is included in the transformation area.

3. The image providing method of claim 2, wherein the setting of the transformation area comprises:
setting one point in the area generated by the figure as a reference point; and
determining the transformation area by reducing the transformation area around the reference point until at least one outer line of the transformation area contacts at least one point on an outer line of the figure.

4. The image providing method of claim 3, wherein the determining of the transformation area comprises determining the transformation area by equally reducing the at least one outer line of the transformation area around the reference point until one outer line from among the at least one outer line of the transformation area contacts one point on the outer line of the figure.

5. The image providing method of claim 3, wherein the determining of the transformation area comprises, when one outer line from among the at least one outer line of the transformation area contacts one point on the outer line of the figure, determining the transformation area by reducing the transformation area by reducing remaining outer lines other than the outer line contacting the one point on the outer line of the figure until the remaining outer lines contact any one point on the outer line of the figure.

6. The image providing method of claim 3, wherein the determining of the transformation area comprises determining, as the transformation area, an enlarged transformation area obtained by enlarging the transformation area which is reduced around the reference point, at a predetermined ratio around the reference point.

7. The image providing method of claim 2, wherein the figure is any one of a polygon and a circle.

8. The image providing method of claim 7, wherein the polygon is a quadrangle.

9. The image providing method of claim 2, wherein the setting of the transformation area comprises displaying at least one outer line of the transformation area on the fisheye image.

10. The image providing method of claim 1, wherein the obtaining of the user input comprises obtaining a user input that sets the area of interest in a shape of a transformation-suitable figure, and
the setting of the transformation area comprises setting the entire area of interest set in the shape of the transformation-suitable figure as a transformation area,
wherein the shape of the transformation-suitable figure is a shape that allows a rectangular transformed image to be generated when the fisheye image corresponding to the transformation-suitable figure is dewarped.

11. The image providing method of claim 10, wherein the obtaining of the user input comprises displaying an input guide line that enlarges or reduces one outer line from among at least one outer line of the transformation-suitable figure on the fisheye image.

12. The image providing method of claim 1, wherein the obtaining of the user input comprises obtaining a user input for a plurality of areas of interest,
the setting of the transformation area comprises setting a transformation area corresponding to each of the plurality of areas of interest, and
the generating of the transformed image comprises generating a transformed image of each of the plurality of areas of interest.

13. The image providing method of claim 1, further comprising, after the generating of the transformed image, displaying the transformed image.

14. An image providing device comprising a controller configured to:
obtain a user input that sets an area of interest on a fisheye image;
set a transformation area corresponding to at least a part of the fisheye image, based on the user input; and
generate a transformed image by dewarping the fisheye image corresponding to the transformation area,
wherein the user input comprises at least two inputs for points defining a figure for setting the area of interest on the fisheye image.

15. The image providing device of claim 14, wherein the transformation area comprises an area generated by the figure.

16. The image providing device of claim 14, wherein the user input comprises a user input that sets the area of interest in a shape of a transformation-suitable figure, and
the transformation area comprises the entire area of interest set in the shape of the transformation-suitable figure,
wherein the shape of the transformation-suitable figure is a shape that allows a rectangular transformed image to be generated when a fisheye image corresponding to the transformation-suitable figure is dewarped.

17. The image providing device of claim 14, wherein the controller is further configured to:
obtain a user input for a plurality of areas of interest;
set a transformation area corresponding to each of the plurality of areas of interest; and
generate a transformed image of each of the plurality of areas of interest.

18. The image providing device of claim 14, wherein the controller is further configured to display the transformed image on a display.

19. A non-transitory computer-readable recording medium storing a computer program for an image providing method, the computer program, when executed by a computer, is configured to:
obtain a user input that sets an area of interest on a fisheye image;
set a transformation area corresponding to at least part of the fisheye image based on the user input; and
generate a transformed image by dewarping the fisheye image corresponding to the transformation area,
wherein the obtaining of the user input comprises obtaining at least two inputs for points defining a figure for setting the area of interest on the fisheye image.

20. A program stored in a non-transitory computer-readable recording medium to execute the method of claim 2 by using a computer.

* * * * *